Patented May 5, 1942

2,282,017

UNITED STATES PATENT OFFICE 2,282,017

RESINOUS PLASTICIZER

George Alexander, Pittsfield, Mass., assignor to General Electric Company, a corporation of New York No Drawing. Original application July 10, 1937, Serial No. 152,992. Divided and this application December 28, 1940, Serial No. 372,189

8 Claims. (Cl. 260—19)

This application is a division of my copending application Serial No. 152,992, filed July 10, 1937, now Patent No. 2,267,390 and assigned to the same assignee as the present invention. In that application I disclosed the production of a varnish especially adapted for making laminated articles to be punched, such varnish being of the type comprising a phenolic resinous composition and a drying oil homogeneously united therewith. In producing the resinous base for the varnish a new and novel plasticizer preferably is employed. The claims in this case are directed to the resinous plasticizer which is particularly suitable for use in producing the resinous products and coating compositions disclosed and claimed in the parent case.

Laminated articles produced, for example, by coating and impregnating paper, cloth and like fibrous sheet material with potentially reactive synthetic resins, superposing the laminae, and subjecting the superposed sheets simultaneously to heat and pressure to bond the laminae firmly together and to convert the resin to the insoluble and infusible state are now well known. When punched parts are made from laminated material, it is desirable that the punchings be smooth and clean-cut. The material should not break or crack on punching. Further, such results should be obtained at minimum cost and without detrimentally affecting the mechanical and electrical properties of the article.

The resinous compositions hereafter described are comparatively inexpensive and are especially adapted for making laminated articles having good electrical and mechanical properties, which articles, when punched, do not break, crack or become delaminated and the edges of which, thereafter, are clean-cut and smooth. In producing these compositions I prepare a phenol-aldehyde condensation product utilizing as the phenolic component a cresol composition, preferably one which meets the following specification—

Engler distillation:
  Initial boiling point above 200° C.
  Less than 10 per cent over at 205° C.
  More than 60 per cent over at 210° C.
  End point (dry point) below 225° C.

Meta-cresol content not over 35 per cent. A product meeting the above specifications consists essentially of meta- and para-cresols, and xylenols. It contains practically no phenol or ortho-cresol. If a commercial cresol having a lower boiling range be used, or one with a higher content of meta-cresol, the resin produced therefrom is turbid, the drying oil does not blend or unite homogenously therewith, and laminated products made with such varnish are hard and break and crack on punching. If a higher boiling commercial cresol be employed, that is one containing a higher percentage of xylenols, the resulting varnish cures very slowly. When such varnish is used in making laminated articles, face sheet adhesion is poor.

I have found that a satisfactory punch stock varnish of the phenolic type should contain a certain amount of oils. Although I have tried numerous oils of both vegetable and animal origin, thus far I have found only two oils, China wood oil and oiticica oil, which produce the desired results. Laminated articles made with varnishes containing such oils have excellent mechanical and electrical properties and good punching characteristics.

I have further found that in addition to oil the varnish preferably should contain a plasticizer for the oil-modified cresol-formaldehyde resinous composition in order to give most satisfactory results. A plasticizer made as hereinafter described from ortho-cresol, formaldehyde and China wood oil in the presence of an alkaline condensing agent or catalyst such as ammonia is compatible with the resinous composition and is preferred. However, the use of other plasticizers is not precluded.

The catalyst used in making the resin is important. In accordance with the present invention there is used a catalyst (condensing agent) selected from the group consisting of ethylene diamine, triethylene tetra-amine, mixtures of such amines, or mixtures of either or both of these amines with ammonia. Ammonia used alone as a catalyst gives products that are satisfactory so far as electrical properties are concerned, but the mechanical properties, as well as face adhesion between laminae, is poor. Ammonia alone as a catalyst is therefore not the equivalent of the catalysts above mentioned. A preferred catalyst comprises a mixture of ethylene diamine and ammonia. Varnish made with such catalyst cures quite rapidly without oil separation, and makes possible the production of hard, dense, laminated sheet material that has excellent punching characteristics, does not delaminate when punched, has high face adhesion between laminae and good electrical and mechanical properties.

In order that those skilled in the art better may understand how my invention may be carried into effect, the following specific example thereof is given:

| Preparation of plasticizer | Pounds |
|---|---|
| Ortho-cresol (99%) | 213 |
| China-wood oil | 64 |
| Aqueous formaldehyde (37½%) | 213 |
| Aqueous ammonia (28%) | 16.7 |

Charge the ortho-cresol and China wood oil to a steam-jacketed reaction vessel or kettle provided with stirring mechanism, mix for about 5 minutes, then add the formaldehyde and finally the ammonia. Put steam into the jacket of the kettle and when the mass reaches a temperature of about 60° C., shut off the steam. React under reflux for a suitable period of time, for example, for about 1 hour, at a temperature of about 94° to 100° C. Introduce a small amount of steam into the jacket during all or a part of the reaction period in order to maintain the desired reaction temperature. At the end of the reaction period, dehydrate the reaction product, preferably under vacuum, for example under a vacuum of 26 inches mercury. When the temperature reaches about 60° C., put steam on the jacket. Continue dehydration under vacuum until the temperature reaches about 75° C. When the mass becomes clear, discontinue application of vacuum. Run cooling water through the jacket until the temperature of the batch is about 60° C., then draw the mass from the kettle. The product is a clear liquid resin having the consistency of a heavy oil. It is used as a plasticizer in the manufacture of the varnish proper.

The ratio of ortho-cresol to formaldehyde may be varied, for example, from 1 mol ortho-cresol to from 1.05 to 1.5 mols formaldehyde. Further excess of formaldehyde serves no useful purpose, merely being volatilized during the reaction or the dehydration period. In place of China-wood oil, oiticica oil or oils having properties of such oil may be used. The minimum amount of oil necessary to provide a fluid composition having effective plasticizing properties when incorporated in the varnish should be used. Preferably the ratio of oil to ortho-cresol-formaldehyde condensation product is from 20 to 40 per cent by weight of the dehydrated resin. In the formula given, the aqueous ammonia may comprise as little as 10 parts by weight. Nothing is gained by using catalyst in large excess. Instead of ammonia other alkaline catalysts may be employed, for example, methyl amine, ethyl amine, ethylene diamine, triethylene tetramine or other aliphatic amines or aromatic amines, or mixtures of such amines, substituted ammonia products such as hexamethylene tetramine, or mixtures of one or more such catalysts with ammonia.

| Preparation of varnish | Pounds |
|---|---|
| Cresol which meets the specifications hereinbefore set forth | 2,000 |
| China wood oil | 800 |
| Aqueous formaldehyde (37½%) | 2,000 |
| Aqueous ammonia (28%) | 60 |
| Ethylene diamine | 10 |
| Stearic acid | 10 |
| Plasticizer made as aforedescribed, approximately | 310 |
| Alcohol | 110 |
| Benzol | 110 |

Put the cresol in a steam-jacketed kettle provided with stirring mechanism and then, while mixing, add the China-wood oil. Mix these ingredients for at least 5 minutes, then add the formaldehyde, next the ammonia and finally the ethylene diamine. Introduce steam into the jacket and when the temperature of the mass reaches about 75° to 80° C., shut off the steam. Generally the reaction starts at a temperature of about 93° to 95° C. within about 35 to 40 minutes after the steam has been turned on the jacket. React under reflux at a temperature of about 94° to 100° C. for a suitable period of time, for example for about 1 to 1½ hours. Introduce a small amount of steam into the jacket during all or part of the reaction period in order to maintain the desired reaction temperature. At the end of the reaction period, dehydrate the reaction product, preferably under vacuum, for example under a vacuum of 15 inches of mercury. When the temperature reaches about 80° to 82° C., put steam on the jacket. Then shut off steam. When the temperature of the mass reaches about 95° to 96° C., take a sample from the kettle and determine its cure point by working (stroking) a small pill of the material weighing about 1 gram on a hot plate maintained at a temperature of 170° C. After the mass has been substantially dehydrated, as indicated by its clearness when cool, and the resin has a cure point, as determined in the manner just described, of about 60 to 80 seconds, and a flow point of about 50° to 70° C., add the plasticizer, then the stearic acid, and put the whole mass under vacuum again for about 5 minutes. Application of vacuum assists in obtaining a homogenous mixture. At the end of this period the resinous mass has a cure point of about 80 to 100 seconds at 170° C. and a flow point of about 40° to 60° C. Add the solvent and mix until the resin is completely in solution. Varnish made in the manner described has a specific gravity at 25° C. of from about 1.015 to 1.020, a viscosity at 25° C. of about 200 to 600 centipoises, and contains from about 58 to 62 per cent of resin base.

In the foregoing formula the ratio of cresol to formaldehyde may be varied, for example, from 1 mol cresol to from 1.05 to 1.5 mols formaldehyde. Nothing is gained by using a further excess of formaldehyde, as such excess merely is driven off as vapor during the reaction or the dehydration period. In place of China-wood oil, oils having properties approximating China-wood oil or in common with China-wood oil may be used, for example oiticica oil. Linseed oil is not the equivalent of China-wood oil in carrying this invention into effect. The minimum amount of oil necessary to provide a resin having a flow point of 40° to 60° C. and having, when mixed with from about 38 to 42 per cent by weight of solvent such as a mixture of equal parts by weight of benzene and alcohol, a viscosity of 200 to 600 centipoises, preferably is used. These ends are attained when the oil is from about 10 to 30 per cent by weight of the cresol-formaldehyde resin formed in the manner described, that is, from about 10 to 30 per cent by weight of the oil-modified cresol-formaldehyde resin. The catalyst should be such as to provide a product having the desired cure point. Within certain limits, which are influenced by other variables in the manufacture of the resin, the rate at which the resin is converted to the insoluble and infusible state may be varied by varying the ratio between the ammonia and the ethylene diamine which, in combination, comprises the preferred catalyst for use in the preparation of the resin. The plasticizer is added in an amount sufficient to provide a punch stock varnish having the hereinbefore-described desirable properties. When the preferred plasticizer is used, advantageously it is employed in an amount corresponding to from about 10 to 16 per cent by weight of the oil-modified cresol-formaldehyde resinous composition. In place of stearic acid, other suitable lubricants may be used, for example, zinc stearate, zinc laurate, paraffin and the like. The lubricant is not essential to the composition and may be omitted or included, as desired or as may be required.

For practical utilization of varnish produced in accordance with this invention in the manufacture of laminated sheet material, it is generally desirable to dilute the varnish further with a suitable solvent. For example, advantageously it may be diluted with alcohol until it contains about 40 per cent of resin base, at which point a varnish initially having a specific gravity of about 1.015 will have a specific gravity of about 0.940.

To make laminated sheet material a continuous sheet of fibrous sheet material such as paper, cloth or the like is coated and impregnated with the clear varnish, for example, by passing the sheet material through a bath of the clear varnish, by spraying or brushing the varnish upon the sheet, or by any other suitable means. The coated and impregnated sheet material is dried to remove solvent. The dried sheets are superposed to form a laminated mass of any desired thickness. They are then pressed in a hot hydraulic press at a temperature of, for example, about 140° to 160° C., and under a pressure of, for instance, about 1000 to 1500 pounds per square inch, for a period sufficient to bond or cement the laminae firmly together and to convert the resin to the insoluble and infusible state. A laminated article having excellent punching characteristics results.

What I claim as new and desire to secure by Letters Patent of the United States is:

1. A clear, liquid resinous composition consisting of the dehydrated product of reaction of ortho-cresol and formaldehyde in the ratio of 1 mol ortho-cresol to at least 1.05 mols formaldehyde and in the presence both of (1) an alkaline condensing agent selected from the class consisting of ammonia, amines and mixtures of ammonia and amines and of (2) an oil selected from the group consisting of China wood oil and oiticica oil, said oil being present in an amount corresponding to from about 20 to 40 per cent by weight of the dehydrated ortho-cresol-formaldehyde resin.

2. A composition as in claim 1 wherein the alkaline condensing agent is ammonia.

3. A composition as in claim 1 wherein the alkaline condensing agent is ethylene diamine.

4. A plasticizer especially adapted for use in the production of a punch-stock varnish, said plasticizer consisting of the dehydrated product of reaction of ortho-cresol and an aqueous solution of formaldehyde in the ratio of 1 mol ortho-cresol to from 1.05 to 1.5 mols formaldehyde and in the presence both of an alkaline condensing agent consisting of ammonia and of China wood oil, said oil being present in an amount corresponding to from about 20 to 40 per cent by weight of the dehydrated ortho-cresol-formaldehyde resin.

5. A plasticizer as in claim 4 wherein the oil component is oiticica oil.

6. A plasticizer as in claim 4 wherein the alkaline condensing agent consists of a mixture of ammonia and ethylene diamine.

7. The method which comprises effecting reaction between ortho-cresol and formaldehyde in the ratio of 1 mol ortho-cresol to at least 1.05 mols formaldehyde and in the presence both of (1) an alkaline condensing agent selected from the class consisting of ammonia, amines and mixtures of ammonia and amines and of (2) an oil selected from the group consisting of China wood oil and oiticica oil, said oil being present in an amount corresponding to from about 20 to 40 per cent by weight of the dehydrated ortho-cresol-formaldehyde resin, and dehydrating the resulting product.

8. The method which comprises heating together under reflux a mixture of ortho-cresol and an aqueous solution of formaldehyde while admixed with China wood oil and a condensation catalyst consisting of ammonia for about 1 hour at a temperature of about 94° to 100° C. thereby to effect reaction between the reactive components and dehydrating the resulting product under vacuum until a clear liquid resin having the consistency of a heavy oil is obtained, said ortho-cresol and formaldehyde being present in the ratio of 1 mol of the former to from 1.05 to 1.5 mols of the latter and said China wood oil being present in an amount corresponding to from about 20 to 40 per cent by weight of the dehydrated ortho-cresol-formaldehyde resin.

GEORGE ALEXANDER.